United States Patent
Baldwin

(10) Patent No.: US 12,149,675 B2
(45) Date of Patent: Nov. 19, 2024

(54) SYSTEMS AND TECHNIQUES FOR CAMERA SYNCHRONIZATION

(71) Applicant: QUALCOMM Incorporated, San Diego, CA (US)

(72) Inventor: Cullum James Baldwin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 171 days.

(21) Appl. No.: 17/840,547

(22) Filed: Jun. 14, 2022

(65) Prior Publication Data

US 2023/0231984 A1     Jul. 20, 2023

Related U.S. Application Data

(60) Provisional application No. 63/301,209, filed on Jan. 20, 2022.

(51) Int. Cl.
*H04N 13/296* (2018.01)
*H04N 23/73* (2023.01)

(52) U.S. Cl.
CPC ........... *H04N 13/296* (2018.05); *H04N 23/73* (2023.01)

(58) Field of Classification Search
CPC .... H04N 13/296; H04N 23/73; H04N 23/662; H04N 23/90; H04N 23/60
See application file for complete search history.

(56) References Cited

U.S. PATENT DOCUMENTS

| | | | | |
|---|---|---|---|---|
| 9,544,492 | B2* | 1/2017 | Zhang | H04N 5/06 |
| 10,348,949 | B2* | 7/2019 | He | H04N 13/243 |
| 2005/0280702 | A1* | 12/2005 | Nakano | H04N 13/239 |
| | | | | 348/42 |
| 2009/0231465 | A1* | 9/2009 | Senba | H04N 23/631 |
| | | | | 348/229.1 |
| 2017/0171433 | A1* | 6/2017 | Ross | H04N 23/45 |
| 2018/0309919 | A1 | 10/2018 | Naing et al. | |
| 2019/0313039 | A1* | 10/2019 | Aggarwal | H04N 23/73 |

(Continued)

OTHER PUBLICATIONS

Gupta M., et al., "Fibonacci Exposure Bracketing for High Dynamic Range Imaging", Proceedings of the IEEE International Conference on Computer Vision (ICCV), IEEE, Dec. 1, 2013, pp. 1473-1480, XP032572992, 8 Pages, Retrieved on Feb. 28, 2014, p. 1474, Right-hand Column.

(Continued)

*Primary Examiner* — Albert H Cutler
(74) *Attorney, Agent, or Firm* — Polsinelli/Qualcomm

(57) ABSTRACT

Systems and techniques are provided for camera synchronization. An example method can include determining, for each camera of a plurality of cameras, a common point within an exposure time corresponding to a frame being requested from each camera. The method can include determining, based on the common point determined for each camera of the plurality of cameras, a respective synchronization error of each camera from the plurality of cameras. The method can include adjusting, based on the respective synchronization error, a duration of the frame at one or more cameras from the plurality of cameras, wherein the adjusted duration of the frame aligns the common point within the exposure time at each camera for the frame.

30 Claims, 8 Drawing Sheets

(56) References Cited

U.S. PATENT DOCUMENTS

2024/0244155 A1\* 7/2024 Sun .................. H04N 23/60

OTHER PUBLICATIONS

International Search Report and Written Opinion—PCT/US2022/080516—ISA/EPO—Feb. 22, 2023.
Onsemi: "½.5-Inch 5 Mp CMOS Digital Image Sensor MT9P031 Data Sheet", Aug. 5, 2021, pp. 1-32, XP093022455, Phoenix, Arizona, US, Retrieved on Feb. 9, 2023, pp. 20,21, Figures 23,24.

\* cited by examiner

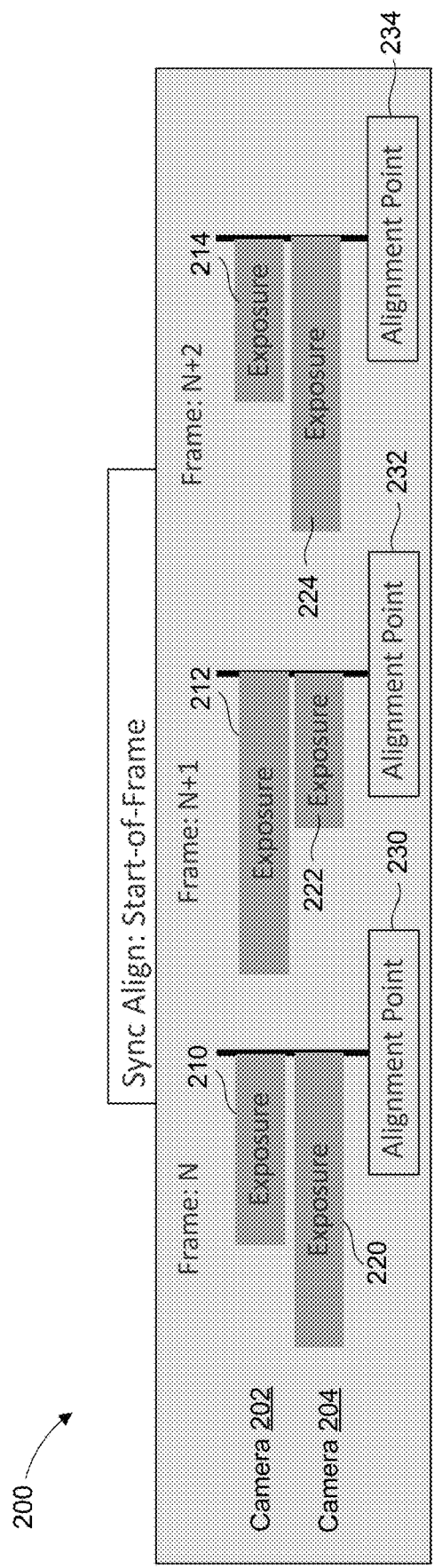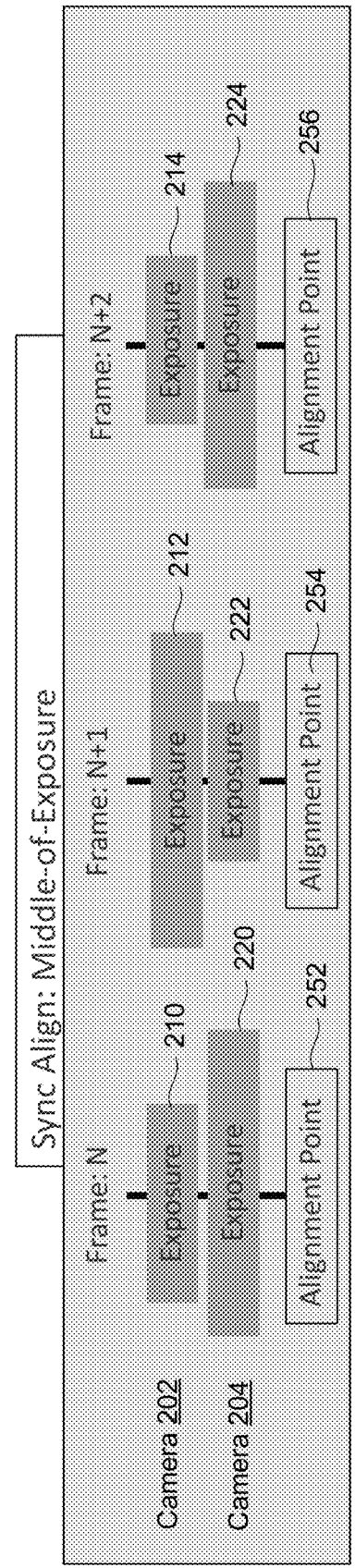

500

---

FOR EACH CAMERA OF A PLURALITY OF CAMERAS, DETERMINE A COMMON POINT WITHIN AN EXPOSURE TIME CORRESPONDING TO A FRAME BEING REQUESTED FROM EACH CAMERA
502

↓

BASED ON THE COMMON POINT DETERMINED FOR EACH CAMERA OF THE PLURALITY OF CAMERAS, DETERMINE A RESPECTIVE SYNCHRONIZATION ERROR OF EACH CAMERA FROM THE PLURALITY OF CAMERAS
504

↓

BASED ON THE RESPECTIVE SYNCHRONIZATION ERROR, ADJUST A DURATION OF THE FRAME AT ONE OR MORE CAMERAS FROM THE PLURALITY OF CAMERAS
506

FIG. 5

SYSTEMS AND TECHNIQUES FOR CAMERA SYNCHRONIZATION

CROSS-REFERENCE TO RELATED APPLICATIONS

This application claims priority to U.S. Provisional Application No. 63/301,209, filed on Jan. 20, 2022, entitled "METHOD AND APPARATUS FOR CAMERA SYNCHRONIZATION", the contents of which are incorporated herein by reference in their entirety and for all purposes.

TECHNICAL FIELD

The present disclosure generally relates to camera synchronization. For example, aspects of the present disclosure relate to systems and techniques for camera synchronization using a feed-forward based implementation.

BACKGROUND

Electronic devices are increasingly equipped with camera hardware that can be used to capture image frames (e.g., still images and/or video frames) for consumption. For example, a computing device (e.g., a mobile device, an Internet Protocol (IP) camera, an extended reality device, a connected device, a laptop computer, a smartphone, a smart wearable device, a game console, etc.) can include one or more cameras integrated with the computing device. The computing device can use the camera to capture an image or video of a scene, a person, an object, or anything else of interest to a user of the computing device. The computing device can capture (e.g., via the camera) an image or video and process, output, and/or store the image or video for consumption (e.g., displayed on the computing device, saved on a storage, sent or streamed to another device, etc.). In some cases, the computing device can further process the image or video for certain effects such as depth-of-field or portrait effects, extended reality (e.g., augmented reality, virtual reality, and the like) effects, image stylization effects, image enhancement effects, etc., and/or for certain applications such as computer vision, extended reality, object detection, recognition (e.g., face recognition, object recognition, scene recognition, etc.), compression, feature extraction, authentication, segmentation, and automation, among others.

BRIEF SUMMARY

Systems and techniques are described herein for camera synchronization. According to at least one example, a method is provided for camera synchronization. The method can include: determining, for each camera of a plurality of cameras associated with the apparatus, a common point within an exposure time of a frame being requested from each camera; determining, based on the common point determined for each camera of the plurality of cameras, a respective synchronization error of each camera from the plurality of cameras; and adjusting, based on the respective synchronization error of each camera, a duration of the frame at one or more cameras from the plurality of cameras, wherein the adjusted duration of the frame aligns the common point within each exposure time at each camera for the frame.

In another example, an apparatus for processing image data is provided. The apparatus includes a memory (e.g., a single memory or multiple memories) and one or more processors (e.g., configured in circuitry) coupled to the memory. The one or more processors are configured to: determine, for each camera of a plurality of cameras associated with the apparatus, a common point within an exposure time of a frame being requested from each camera; determine, based on the common point determined for each camera of the plurality of cameras, a respective synchronization error of each camera from the plurality of cameras; and adjust, based on the respective synchronization error of each camera, a duration of the frame at one or more cameras from the plurality of cameras, wherein the adjusted duration of the frame aligns the common point within each exposure time at each camera for the frame.

In another example, a non-transitory computer-readable medium is provided, containing instructions which, when executed by one or more processors, cause the one or more processors to: determine, for each camera of a plurality of cameras associated with the apparatus, a common point within an exposure time of a frame being requested from each camera; determine, based on the common point determined for each camera of the plurality of cameras, a respective synchronization error of each camera from the plurality of cameras; and adjust, based on the respective synchronization error of each camera, a duration of the frame at one or more cameras from the plurality of cameras, wherein the adjusted duration of the frame aligns the common point within each exposure time at each camera for the frame.

In another example, an apparatus for processing image data is provided. The apparatus includes: means for determining, for each camera of a plurality of cameras associated with the apparatus, a common point within an exposure time of a frame being requested from each camera; means for determining, based on the common point determined for each camera of the plurality of cameras, a respective synchronization error of each camera from the plurality of cameras; and means for adjusting, based on the respective synchronization error of each camera, a duration of the frame at one or more cameras from the plurality of cameras, wherein the adjusted duration of the frame aligns the common point within each exposure time at each camera for the frame.

In some aspects, each of the apparatuses described above is, can be part of, or can include a mobile device, a smart or connected device, a camera system, and/or an extended reality (XR) device (e.g., a virtual reality (VR) device, an augmented reality (AR) device, or a mixed reality (MR) device). In some examples, the apparatuses can include or be part of a mobile device (e.g., a mobile telephone or so-called "smart phone" or other mobile device), a wearable device, a personal computer, a laptop computer, a tablet computer, a server computer, a robotics device or system, or other device. In some aspects, the apparatus includes an image sensor (e.g., a camera) or multiple image sensors (e.g., multiple cameras) for capturing one or more images. In some aspects, the apparatus includes one or more displays for displaying one or more images, notifications, and/or other displayable data. In some aspects, the apparatus includes one or more speakers, one or more light-emitting devices, and/or one or more microphones. In some aspects, the apparatuses described above can include one or more sensors. In some cases, the one or more sensors can be used for determining a location of the apparatuses, a state of the apparatuses (e.g., a tracking state, an operating state, a temperature, a humidity level, and/or other state), and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures:

FIG. 2A is a diagram illustrating an example camera synchronization alignment, in accordance with some examples of the present disclosure;

FIG. 2B is a diagram illustrating another example camera synchronization alignment, in accordance with some examples of the present disclosure;

FIG. 5 is a flowchart illustrating an example process for camera synchronization, in accordance with some examples of the present disclosure.

DETAILED DESCRIPTION

Figure 1:
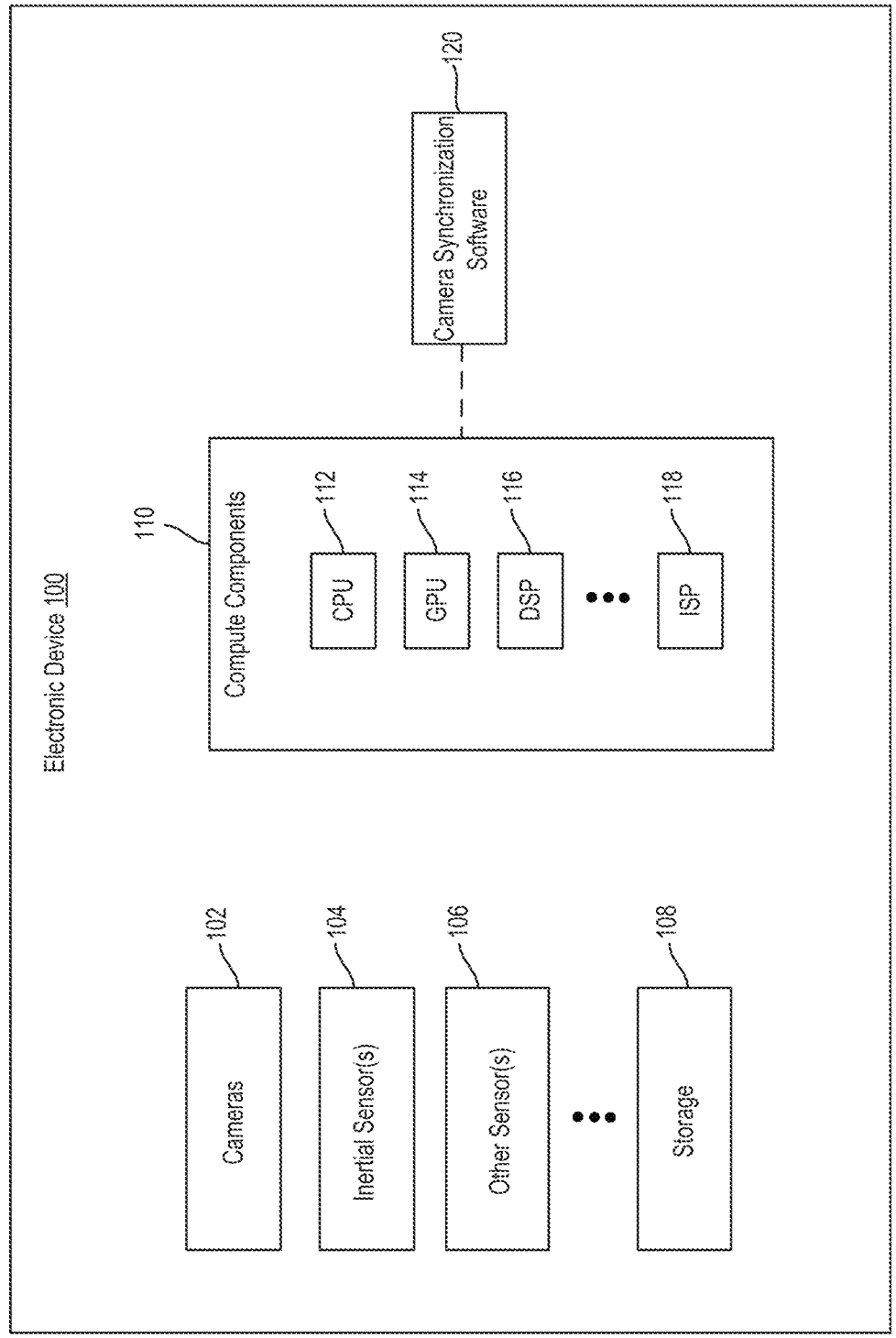
FIG. 1 is a simplified block diagram illustrating an example electronic device, in accordance with some examples of the present disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the scope of the application as set forth in the appended claims.

As previously noted, electronic devices are increasingly equipped with camera hardware to capture image frames (e.g., still images and/or video frames) for consumption. For example, a computing device, such as a mobile telephone or smartphone, a laptop computer, a head-mounted display, a smart wearable device, a game console, a smart television, a smart appliance, a tablet computer, etc., can include a camera(s) that enables the computing device to capture a video or image of a scene, a person, an object, etc. The computing device can capture the image or video (e.g., via the camera) and process, store, and/or output the image or video for consumption (e.g., displayed on the computing device and/or another device). In some cases, the computing device can further process the image or video for certain effects, such as extended reality (XR) effects, depth-of-field effects, image enhancement effects, etc. The computing device can use the camera hardware on the computing device and/or the image frames captured by the camera hardware for a variety of applications such as, for example and without limitation, computer vision, XR, object detection, recognition (e.g., face recognition, object recognition, scene recognition, etc.), feature extraction, segmentation, authentication, photography, tracking, localization, and automation, among others.

To illustrate, XR (e.g., augmented reality, virtual reality, mixed reality, etc.) devices, such as smart glasses and head-mounted displays (HMDs), generally implement cameras and a variety of sensors to track the position of the extended reality (XR) device and other objects within the physical environment. The XR devices can use the tracking information to provide a user of the XR device a realistic XR experience. For example, an XR device can allow a user to experience or interact with immersive virtual environments or content. To provide realistic XR experiences, XR technologies can integrate virtual content with the physical world. In some cases, XR technologies can match the relative pose and movement of objects and devices in the physical world. For example, an XR device can use tracking information to calculate the relative pose of devices, objects, and/or maps of the real-world environment in order to match the relative position and movement of the devices, objects, and/or the real-world environment. Using the pose and movement of one or more devices, objects, and/or the real-world environment, the XR device can render content relative to the real-world environment in a convincing manner. The relative pose information can be used to match virtual content with the user's perceived motion and the spatio-temporal state of the devices, objects, and real-world environment.

In many cases, electronic devices are equipped with multiple cameras for recording image frames (e.g., still images and/or video frames). Generally, in multi-camera setups, the timing relationship between the different cameras can be used to synchronize the cameras in order to avoid various issues such as, for example, artifacts, camera frame and/or exposure misalignment, among other problems. In some cases, the camera synchronization can synchronize at one or more points in the frame capture and/or frame processing process. For example, the frame capture and/or frame processing process can include a start of exposure time or point, a middle of exposure time or point, an end of exposure time or point, and a start of frame time or point. For instance, in some cases, depending on a camera-to-computer setup (e.g., how the camera sensor is connected and/or controlled by the hardware and/or software of the computer), the "default" alignment might be start of frame or start of exposure. The start of exposure refers to the time when a camera starts an exposure (e.g., when the camera sensor starts capturing light to generate an exposure), the middle of exposure refers to the time at the middle of the exposure (e.g., the halfway point), the end of exposure refers to the time when an exposure ends/completes, and the start of frame refers to the time when the electronic device (e.g., one or more processors of the electronic device) begin receiving data from the camera sensor. The cameras can be synchronized at the start of exposure, middle of exposure, end of exposure, and/or start of frame.

Some use cases may need the camera synchronization to occur at, and/or be based on, one or more particular points/times (e.g., at the start of exposure, middle of exposure, end of exposure, and/or start of frame). For example, in some cases, the camera synchronization may need to occur at and/or be based on the middle of exposure time associated with the cameras being synchronized. To illustrate, XR implementations can include a model(s) that models the scene where the electronic device (e.g., the XR device) is located as well as interactions of the cameras. In some cases, because of certain assumptions used by the model, the camera sensors on the electronic device may need to run independent exposures aligned at the middle of exposure point to avoid creating errors in the modeling.

For example, in some implementations, an XR application implementing six degrees of freedom (6DOF) may require cameras on an electronic device to be aligned at the middle of exposure while running auto exposure (AE) independently on each camera. However, the electronic device may be configured to only align the software of the cameras at the start of frame (SOF). In some cases, because of how the camera hardware operates, the camera synchronization algorithm may not be able to align the cameras and/or perform the camera synchronization at the middle of exposure.

Systems, apparatuses, processes (also referred to as methods), and computer-readable media (collectively referred to as "systems and techniques") are described herein for camera synchronization. In some examples, the systems and techniques described herein can perform a feed-forward based camera software synchronization. In some cases, the systems and techniques described herein can align multiple cameras and/or perform camera synchronization for multiple cameras at one or more points (and/or based on one or more points). For example, in some cases, the systems and techniques described herein can align multiple cameras and/or perform the camera synchronization for multiple cameras at the middle of exposure point. The alignment and/or camera synchronization at the middle of exposure point can address and/or prevent various problems that otherwise occur when cameras are not synchronized at the middle of exposure point, as previously explained.

Examples of the systems and techniques described herein for processing image data are illustrated in FIG. 1 through FIG. 6 and described below.

FIG. 1 is a diagram illustrating an example electronic device 100, in accordance with some examples of the disclosure. The electronic device 100 can implement the systems and techniques disclosed herein. For example, in some cases, the electronic device 100 can perform camera synchronization at the middle of exposure point. The electronic device 100 can perform various tasks and operations such as, for example and without limitation, extended reality tasks and operations (e.g., tracking, mapping, localization, content rendering, pose estimation, object detection/recognition, etc.), image/video processing and/or post-processing, data processing and/or post-processing, computer graphics, machine vision, object modeling and registration, multimedia rendering and/or composition, camera synchronization, and/or any other data processing tasks, effects, and/or computations. In some examples, the electronic device 100 can perform feed-forward based camera synchronization, as further described herein.

In the example shown in FIG. 1, the electronic device 100 includes cameras 102, one or more inertial sensors 104 (e.g., one or more inertial measurement units), one or more other sensors 106 (e.g., one or more radio detection and ranging (radar) sensors, light detection and ranging (LIDAR) sensors, acoustic/sound sensors, infrared (IR) sensors, magnetometers, touch sensors, laser rangefinders, light sensors, proximity sensors, motion sensors, active pixel sensors, machine vision sensors, ultrasonic sensors, etc.), storage 108, compute components 110, and camera synchronization software 120. In some cases, the electronic device 100 can include additional software and/or software engines such as, for example, an XR engine, an image processing engine, a rendering engine, etc.

It should be noted that the components 102 through 120 shown in FIG. 1 are non-limiting examples provided for illustration and explanation purposes, and other examples can include more, less, and/or different components than those shown in FIG. 1. For example, in some cases, the electronic device 100 can include one or more display devices, one more other processing engines, one or more receivers (e.g., global positioning systems, global navigation satellite systems, etc.), one or more communications devices (e.g., radio frequency (RF) interfaces and/or any other wireless/wired communications receivers/transmitters), one or more other hardware components, and/or one or more other software and/or hardware components that are not shown in FIG. 1. An example architecture and example hardware components that can be implemented by the electronic device 100 are further described below with respect to FIG. 6.

Moreover, references to any of the components of the electronic device 100 in the singular should not be interpreted as limiting the number of such components implemented by the electronic device 100 to one. For example, references to a processor in the singular form should not be interpreted as limiting the number of processors implemented by the electronic device 100 to one.

The cameras 102 in FIG. 1 can include any number of cameras. For example, the cameras 102 can include two cameras in a dual-camera implementation or more than two cameras in other, multi-camera implementations. The electronic device 100 can be part of, or implemented by, a single computing device or multiple computing devices. In some examples, The electronic device 100 can be part of an electronic device (or devices) such as a camera system (e.g., a digital camera, an IP camera, a video camera, a security camera, etc.), a telephone system (e.g., a smartphone, a cellular telephone, a conferencing system, etc.), a desktop computer, a laptop or notebook computer, a tablet computer, a set-top box, a smart television, a display device, a gaming console, a video streaming device, an IoT (Internet-of-Things) device, a smart wearable device (e.g., a head-mounted display (HMD), smart glasses, etc.), or any other suitable electronic device(s).

In some implementations, the cameras 102, one or more inertial sensor(s) 104, the other sensor(s) 106, storage 108, compute components 110, and camera synchronization software 120 can be part of the same computing device. For example, in some cases, the cameras 102, one or more inertial sensor(s) 104, one or more other sensor(s) 106, storage 108, compute components 110, and camera synchronization software 120 can be integrated into a smartphone, laptop, tablet computer, smart wearable device, gaming system, and/or any other computing device. In other implementations, the cameras 102, one or more inertial sensor(s) 104, the other sensor(s) 106, storage 108, compute components 110, and camera synchronization software 120 can be part of two or more separate computing devices. For example, in some cases, some of the components 102 through 120 can be part of, or implemented by, one computing device and the remaining components can be part of, or implemented by, one or more other computing devices.

The cameras 102 can include one or more image sensor. In some examples, the cameras 102 can include any image and/or video sensors or capturing devices, such as a digital camera sensor, a video camera sensor, a smartphone camera sensor, an image/video capture device on an electronic apparatus such as a television or computer, a camera, etc. In some cases, the cameras 102 can be part of a multi-camera system or a computing device such as an XR device (e.g., an HMD, smart glasses, etc.), a digital camera system, a smartphone, a smart television, a game system, etc. The cameras 102 can capture image and/or video content (e.g., raw image and/or video data), which can be processed by the compute components 110.

In some examples, the cameras 102 can capture image data and generate frames based on the image data and/or provide the image data or frames to the compute components 110 for processing. A frame can include a video frame of a video sequence or a still image. A frame can include a pixel array representing a scene. For example, a frame can be a red-green-blue (RGB) frame having red, green, and blue color components per pixel; a luma, chroma-red, chroma-blue (YCbCr) frame having a luma component and two chroma (color) components (chroma-red and chroma-blue) per pixel; or any other suitable type of color, monochrome picture, or depth image from a depth camera.

The electronic device 100 can optionally include inertial sensor(s) 104. The inertial sensor(s) 104 can detect a specific force and angular rate of the electronic device 100. In some cases, the inertial sensor(s) 104 can detect an orientation of the electronic device 100. The inertial sensor(s) can generate linear acceleration measurements, rotational rate measurements, and/or heading measurements. In some examples, the inertial sensor(s) 104 can be used to measure the pitch, roll, and yaw of the electronic device 100.

The electronic device 100 can optionally include one or more other sensor(s) 106. In some examples, the one or more other sensor(s) 106 can detect and generate other measurements used by the electronic device 100. In some cases, the compute components 110 can use data and/or measurements from the cameras 102, the one or more inertial sensor(s) 104, and/or the one or more other sensor(s) 106 to track a pose of the electronic device 100. As previously noted, in other examples, The electronic device 100 can also include other sensors, such as a magnetometer, an acoustic/sound sensors, an IR sensor, a machine vision sensor, a smart scene sensor, a radar sensor, a LIDAR sensor, a light sensor, etc.

The storage 108 can be any storage device(s) for storing data. Moreover, the storage 108 can store data from any of the components of the electronic device 100. For example, the storage 108 can store data from the cameras 102 (e.g., image or video data), data from the one or more inertial sensor(s) 104 (e.g., measurements), data from the one or more other sensor(s) 106 (e.g., measurements), data from the compute components 110 (e.g., processing parameters, timestamps, preferences, virtual content, rendering content, scene maps, tracking and localization data, object detection data, configurations, XR application data, recognition data, synchronization data, outputs, etc.), and/or data from the camera synchronization software 120. In some examples, the storage 108 can include a buffer for storing frames and/or other camera data for processing by the compute components 110.

The one or more compute components 110 can include a central processing unit (CPU) 112, a graphics processing unit (GPU) 114, a digital signal processor (DSP) 116, and/or an image signal processor (ISP) 118. The compute components 110 can perform various operations such as camera synchronization, image enhancement, computer vision, graphics rendering, extended reality (e.g., tracking, localization, pose estimation, mapping, content anchoring, content rendering, etc.), image/video processing, sensor processing, recognition (e.g., text recognition, facial recognition, object recognition, feature recognition, tracking or pattern recognition, scene recognition, occlusion detection, etc.), machine learning, filtering, object detection, and any of the various operations described herein. In the example shown in FIG. 1, the compute components 110 can implement camera synchronization software 120 to perform camera synchronization as further described herein. In other examples, the compute components 110 can also implement one or more other processing engines.

The operations for the camera synchronization software 120 can be implemented by any of the compute components 110. In some examples, the camera synchronization software 120 can use a feedback loop to synchronize the cameras 102. For example, in some cases, the camera synchronization software 120 can first sample a timing of each camera being synchronized (e.g., cameras 102). The camera synchronization software 120 can then calculate synchronization error between the cameras 102 and adjust a timing of the cameras 102 to remove the synchronization error. The camera synchronization software 120 can then wait for camera timing update to be implemented/applied by the cameras 102 before re-sampling the timing of the cameras 102. In some examples, the camera synchronization software 120 can wait a certain number of frames, such as, for example, 4 frames, 5 frames, 6 frames, 7 frames, 8 frames, etc. After waiting for the camera timing update to be implemented/applied by the cameras 102, the camera synchronization software 120 can again sample the timing of each camera and calculate a synchronization error between the cameras 102, if one exists.

This example camera synchronization provides simplicity, is stateless (e.g., does not require to store/buffer camera settings), can be robust/tolerant to frame drops, etc. In some cases, this example camera synchronization may have a higher update delay, such as an update delay of 4 to 8 frames, and may need the camera synchronization alignment to occur at the start of frame due to hardware details of the cameras. The camera synchronization alignment may need to occur at the start of frame because each time an exposure is changed, such change can temporally shift the middle of exposure (or other point within the exposure) but does not move the start of frame. Moreover, cameras synchronized at the start of frame may not require any timing adjustment when either camera exposure is updated. Also, cameras synchronized at a point within the exposure period (e.g., the middle of exposure point) may require a timing correction every time either camera exposure is updated. After any timing update, the feedback algorithm used may need to wait a certain number of frames (e.g., 4-8 frames) before making another timing update. In some cases, the wait/delay between exposure updates may yield an unacceptable auto-exposure (AE) performance.

In other examples, the camera synchronization software 120 may use a feed forward algorithm to implement alignment with a point within the exposure period, such as middle of exposure alignment. While examples are described herein for aligning the middle of exposure of multiple cameras, the systems and techniques described herein can be applied to align other points within an exposure period other than the start of exposure or end of exposure. In some cases, the feed forward algorithm can be as follows. For each camera, the camera synchronization software 120 calculates a desired exposure for future frame N, and predicts a start of frame for pending frame N−1. To predict the start of frame for pending frame N−1, the camera synchronization software 120 may store/buffer timing information used to predict the start of frame for pending frame N−1, such as a start of exposure N and/or N−1, an end of exposure N and/or N−1, a delay(s) between an exposure and a start of frame, and/or any other timing information. For each camera, the camera synchronization software 120 can then calculate the start of frame for frame N to align at the middle of exposure.

The feed forward algorithm for implementing middle of exposure alignment may avoid or limit any update delays and allows alignment at the middle of exposure point. In some cases, the feed forward algorithm can be complex and may need state book-keeping to predict future/pending frame exposures and start of frames.

While the electronic device 100 is shown to include certain components, one of ordinary skill will appreciate that the electronic device 100 can include more or fewer components than those shown in FIG. 1. For example, the electronic device 100 can also include, in some instances, one or more memory devices (e.g., RAM, ROM, cache, and/or the like), one or more network interfaces (e.g., wired and/or wireless communications interfaces and the like), one or more display devices, and/or other hardware or processing devices that are not shown in FIG. 1. An illustrative example of a computing device and hardware components that can be implemented with the electronic device 100 is described below with respect to FIG. 6.

FIG. 2A is a diagram illustrating an example camera synchronization alignment 200, in accordance with some examples of the present disclosure. The camera synchronization alignment 200 can be implemented to align the timing (and/or timing relationship) of the camera software of camera 202 and camera 204. Camera 202 and camera 204 can be the same or similar as the cameras 102 shown in FIG. 1.

As shown, the camera synchronization alignment 200 aligns the cameras 202 and 204 at the start of frame (SOF). For example, for frame n, the camera synchronization alignment 200 can align the exposure 210 from camera 202 and the exposure 220 from camera 204 at alignment point 230. For frame n+1 (e.g., future frame), the camera synchronization alignment 200 can align the exposure 212 from camera 202 and the exposure 222 from camera 204 at alignment point 232. For frame n+2 (and any subsequent frames), the camera synchronization alignment 200 can align the exposure 214 from camera 202 and the exposure 224 from camera 204 at alignment point 234. In this example, the alignment points 230, 232, and 234 are at the SOF, which is the point when the cameras 202 and 204 send (or start sending) image data to one or more processors of the electronic device (e.g., electronic device 100) performing the camera synchronization alignment 200.

As previously mentioned, some camera use cases may need the camera synchronization to align the cameras 202 and 204 at the middle of exposure point. FIG. 2B is a diagram illustrating another example camera synchronization alignment 250, in accordance with some examples of the present disclosure. In this example, the camera alignment in the example camera synchronization alignment 250 is performed at the middle of exposure point. For example, for frame n, the camera synchronization alignment 250 can align the exposure 210 from camera 202 and the exposure 220 from camera 204 at alignment point 252. For frame n+1 (e.g., future frame), the camera synchronization alignment 250 can align the exposure 212 from camera 202 and the exposure 222 from camera 204 at alignment point 254. For frame n+2 (and any subsequent frames), the camera synchronization alignment 250 can align the exposure 214 from camera 202 and the exposure 224 from camera 204 at alignment point 256.

Here, the alignment points 252, 254, and 256 are at the middle of exposure. For example, the alignment point 252 is at the middle of exposure 210 from camera 202 and exposure 220 from camera 204, the alignment point 254 is at the middle of exposure 212 from camera 202 and exposure 222 from camera 204, and the alignment point 254 is at the middle of exposure 214 from camera 202 and exposure 224 from camera 204.

In some examples, the camera synchronization alignment 250 may implemented using a feed forward algorithm. In some cases, the feed forward algorithm can be as follows. For each camera (e.g., camera 202 and camera 204), the system calculates a desired exposure for future frame N, and predicts a start of frame for pending frame N−1. To predict the start of frame for pending frame N−1, the system may store/buffer timing information used to predict the start of frame for pending frame N−1, such as a start of exposure N and/or N−1, an end of exposure N and/or N−1, a delay(s) between an exposure and a start of frame, and/or any other timing information. For each camera, the system can then calculate the start of frame for frame N to align at the middle of exposure.

In some cases, synchronization of camera sensors of different types/versions, camera sensors that have different hardware, and/or camera sensors that have different configurations can cause even the end of exposure (EOE) to not be automatically aligned. The feedback algorithms described herein can align the EOE of the camera sensors by accounting for the fixed sensor read delay (SRD) difference between the camera sensors.

Figure 2C:
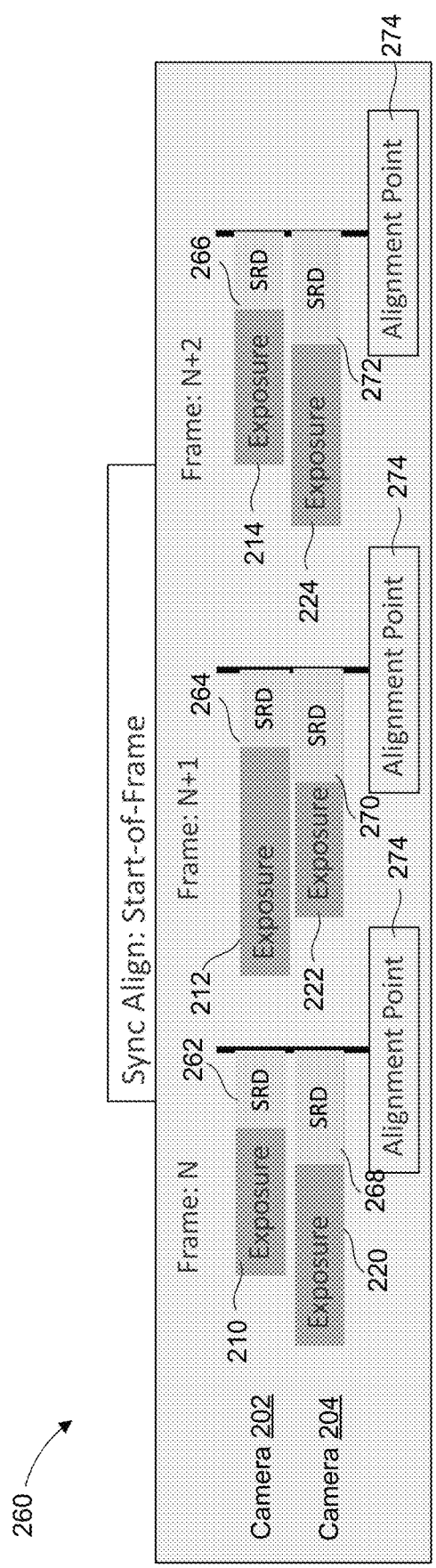
FIGS. 2C through 2E are diagrams illustrating example camera synchronization alignments in use cases involving mixed camera sensors and/or mixed configurations, in accordance with some examples of the present disclosure.
Figure 2D:
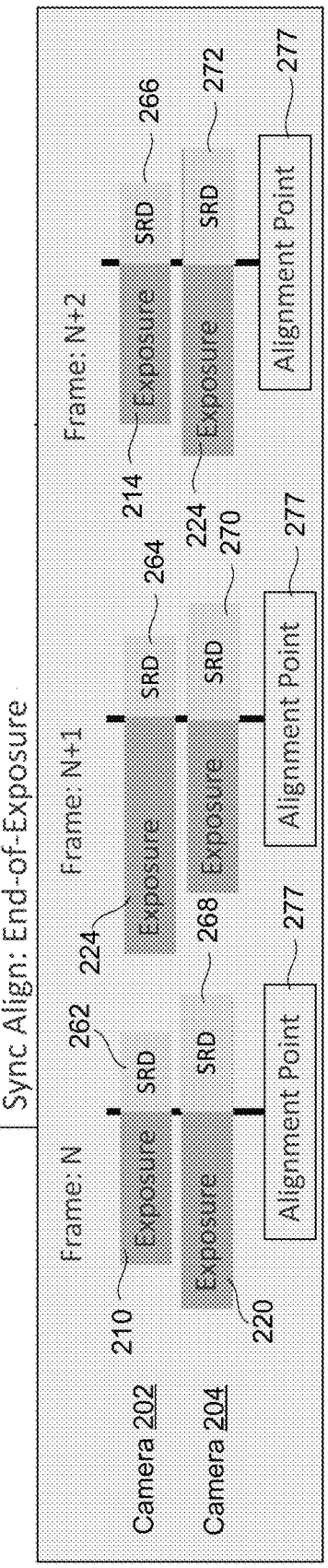
Figure 2E:
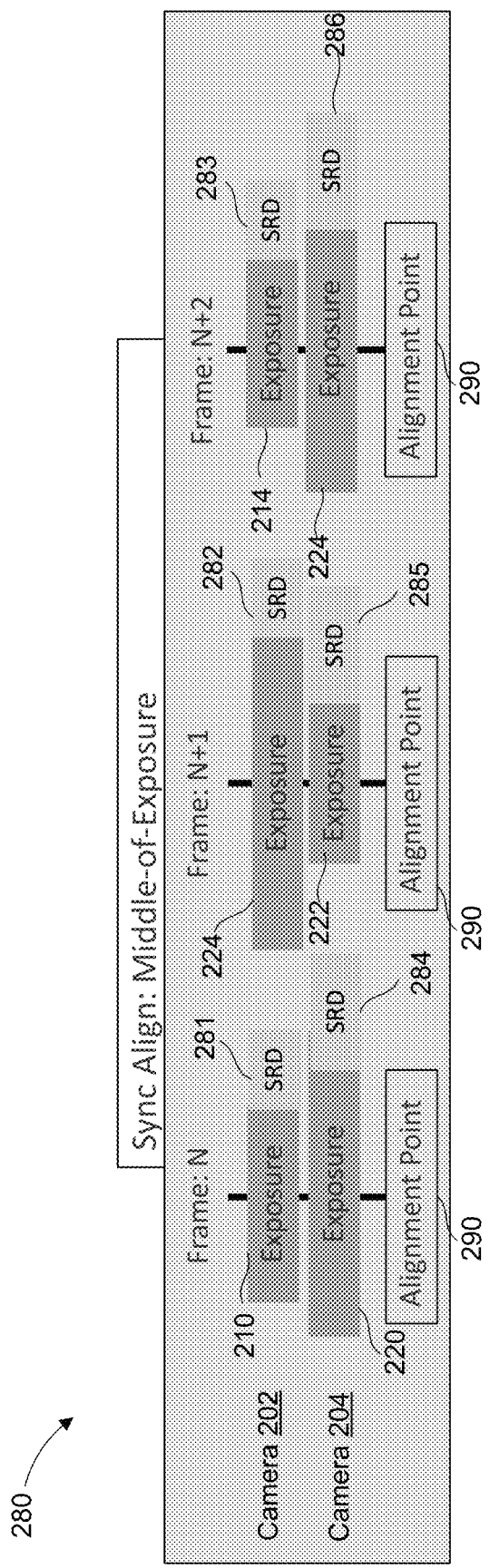

FIGS. 2C through 2E are diagrams illustrating example camera synchronization alignments in use cases involving mixed camera sensors (e.g., different types/versions of camera sensors, camera sensors that have different hardware, etc.) and/or mixed configurations (e.g., different configurations). For example, FIG. 2C illustrates an example camera synchronization alignment 260 in use cases with mixed camera sensors and/or mixed camera configurations. The synchronization alignment 260 aligns the timing of camera 202 and camera 204 at the start of frame point (e.g., after the EOE and the SRDs 262-272).

As shown, when mixed camera sensors (and/or camera sensors with mixed timing and/or resolution settings) are synchronized, the SRDs 262-272 may vary between camera sensors. In some examples, the synchronization algorithms described herein can account for differences in the SRDs 262-272 to align exposures 210-214 and 220-224. When the SRDs 262-272 do not match, an alignment at the start of frame may not imply or result in alignment at the EOE. The alignment points 274 in FIG. 2C account for the differences in the SRDs 262-272 associated with the cameras 202 and 204, to allow proper alignment at the start of frame.

FIG. 2D illustrates another example camera synchronization alignment 275 in use cases with mixed camera sensors and/or mixed camera configurations. As shown, the alignment points 277 in the camera synchronization alignment 275 account for the differences in the SRDs 262-272 to align exposures 210-214 and 220-224 at the EOE and before the SRDs 262-272.

FIG. 2E illustrates another example camera synchronization alignment 280 in use cases with mixed camera sensors and/or mixed camera configurations. In this example, the camera synchronization alignment 280 is performed at the middle of exposure point. As shown, the alignment points 290 in the camera synchronization alignment 280 account for the differences in the SRDs 262-272 to align exposures 210-214 and 220-224 at the middle of exposure point.

In FIGS. 2A through 2E, at least some of the exposures 210-214 and 220-224 are shown as having different exposure times. However, in other examples, the camera synchronization alignment 200, the camera synchronization alignment 250, the camera synchronization alignment 275, and/or the camera synchronization alignment 280 can be implemented with exposures of the same exposure time and/or any other variation of exposure times. While the camera synchronization alignment 200, the camera synchronization alignment 250, the camera synchronization alignment 275, and the camera synchronization alignment 280 are respectively shown with two example cameras, one of ordinary skill in the art will recognize in view of the present disclosure that, in other examples, the camera synchronization alignment 200, the camera synchronization alignment 250, the camera synchronization alignment 275, and/or the camera synchronization alignment 280 can be performed with more than two cameras.

Figure 3:
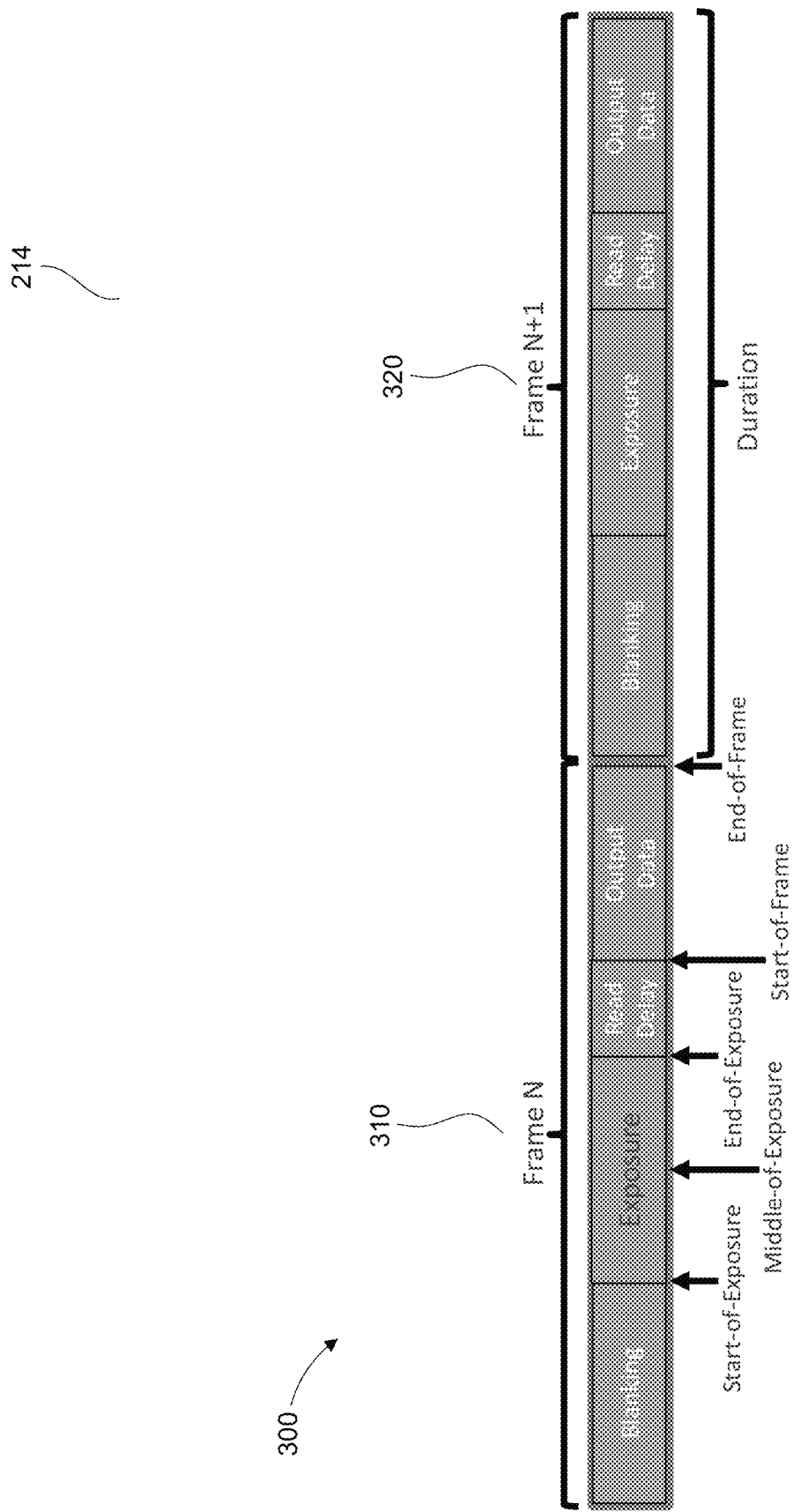
FIG. 3 is a diagram illustrating an example timing of frames, in accordance with some examples of the present disclosure.

FIG. 3 is a diagram illustrating an example timing 300 of frames 310 and 320. Frame timing points can include start of exposure, which can include when pixel exposure begins (e.g., shutter time); middle of exposure, which can include when pixel exposure is 50% complete; end of exposure, which can include when pixel exposure is 100% complete; start of frame (SOF), which can include when the camera sensor starts sending data to the processor; and end of frame, which can include when the camera sensor is done sending data to the processor.

In some examples, the exposure and duration can be adjustable fields. For example, the exposure can be adjusted to increase/decrease the time that the camera sensor captures light. Changing the exposure time only moves the start of exposure and the middle of exposure. Moreover, the duration can be adjusted to increase/decrease the total frame time. Changing the duration can move all timing points (e.g., start of exposure, middle of exposure, end of exposure, start of frame).

In some examples, the camera synchronization can align the timing by adjusting the duration. In some cases, feedback-based camera synchronization make updates every 7-8 frames due to frame request delays. Since the exposure may be changed at every (or any) frame, the camera synchronization can align timing points that are not moved by exposure updates (e.g., start of frame, end of exposure, and/or end of frame). In some cases, feed-forward based camera synchronization can make updates at every frame. This allows the camera synchronization to align any timing point in the frame.

With global-shutter cameras, the timing will be identical for all lines and pixels. For rolling-shutter cameras, the timing for each line of pixels will be offset slightly. In some implementations, a read delay may be constant but may vary between camera sensors. In some examples, the read delay may vary when using identical camera sensors (and/or the same type of camera sensors) with different timing or resolution settings. This can have an impact in cases where different camera sensors are synchronized.

Figure 4:
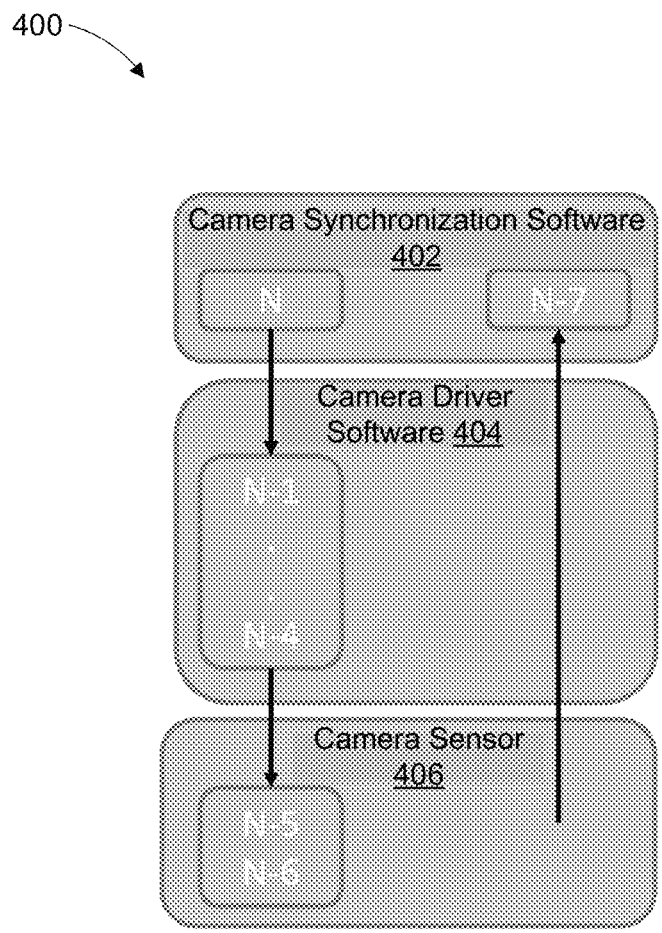
FIG. 4 is a diagram illustrating an example frame request delay, in accordance with some examples of the present disclosure.

FIG. 4 is a diagram illustrating an example frame request delay 400. In this example, the frame request delay 400 results in a delay of 4 to 8 frames. As shown, the system can use three distinct system layers to handle frame requests and process frame results. The layers can include a camera synchronization software 402 layer, a camera driver software 404 layer, and a camera sensor hardware 406 layer.

The camera synchronization software 402 layer can include the host software algorithm that implements the "feedback"/"feed forward" logic to align camera timings. The camera driver software 404 layer can include the host software that provides basic camera control and scheduling. The camera sensor hardware 406 layer can include the physical sensor which is controlled by the cam driver software.

In some examples, frame requests and frame results flow through hardware/software queues to allow asynchronous handling. An example of a frame sequence is as follows. Frame N−7 includes the most recently completed frame, frame N−6 includes the frame actively running in the camera sensor hardware, frame N−5 includes the frame being actively loaded into the camera sensor hardware, frames N−4 to N−1 include the frames being prepared to load into the camera sensor hardware, and frame N includes the frame request being prepared by the camera synchronization software algorithm.

In some cases, the delay can be reduced by queueing fewer frames with the camera driver software (e.g., frames N−4 to N−1), though this may come with a risk of creating frame drops and/or a risk of losing a synchronized state (e.g., a loss of camera synchronization). In some examples, a feed-forward camera synchronization algorithm can predict frame timestamps and synchronization errors. For example, a feed-forward camera synchronization algorithm can allow updating of the camera sensor duration every frame but may involve calculating the expected frame timestamp and synchronization error in advance.

In some examples, at step 1, a feed-forward camera synchronization algorithm can first calculate, for each camera, a middle of exposure (MOE) for future frame N. The feed-forward camera synchronization algorithm can use state data to calculate the MOE for future frame N. In some examples, the state data can include a camera sensor read delay (SRD) corresponding to the sensor-specific read delay between the end of exposure (EOE) and the start of frame (SOF), the SOF for the last captured frame (e.g., N−7), the duration for the pending frames (e.g., frames N−6 to N−1) and the frame being requested (e.g., frame N), and the exposure for the frame being requested (e.g., frame N).

An example pseudocode to predict the MOE at step 1 can be as follows.

$$MOE_{FrameN} = SOF_{FrameN-7} - SRD + Duration_{FrameN-6} + Duration_{FrameN-5} + Duration_{FrameN-4} + Duration_{FrameN-3} + Duration_{FrameN-2} + Duration_{FrameN-1} + Duration_{FrameN} - Exposure_{FrameN}/2 \quad \text{Equation 1}$$

At step 2, the feed-forward camera synchronization algorithm can calculate a synchronization error between the cameras (e.g., CamA, CamB, CamC, CamD, etc.), as shown below.

$$\text{SyncErr}_{CamA/B} = \text{CamA-MOE}_{FrameN} - \text{CamB-MOE}_{FrameN}$$

$$\text{SyncErr}_{CamA/C} = \text{CamA-MOE}_{FrameN} - \text{CamC-MOE}_{FrameN}$$

$$\text{SyncErr}_{CamA/D} = \text{CamA-MOE}_{FrameN} - \text{CamD-MOE}_{FrameN} \quad \text{Equation 2}$$

At step 3, the feed-forward camera synchronization algorithm can correct the planned duration for frame N to force the synchronization error to 0, as shown below.

$$\text{CamA-Duration}_{FrameN} \rightarrow \text{No change as CamA is the synchronization master}$$

$$\text{CamB-Duration}_{FrameN} = \text{CamB-Duration}_{FrameN} + \text{SyncErr}_{CamA/B}$$

$$\text{CamC-Duration}_{FrameN} = \text{CamC-Duration}_{FrameN} + \text{SyncErr}_{CamA/C}$$

$$\text{CamD-Duration}_{FrameN} = \text{CamD-Duration}_{FrameN} + \text{SyncErr}_{CamA/D} \quad \text{Equation 3}$$

In some cases, an implementation of the middle of exposure alignment described herein can support multiple cameras running independent AE and can maintain a synchronization to 0.1 milliseconds or better. In some cases, synchronization quality may be approximately one "sensor-line-time", which is the sensor timing granularity. Sensor timing granularity can vary based on configuration and sensor. For example, a camera sensor running at 90 Hertz (Hz) at resolution of 640×480 has a line-time of roughly 0.02 ms. Such a camera sensor thus allows adjusting exposure/duration in steps of 0.02 ms, and by implication synchronization accuracy between a pair of these sensors will be roughly 0.02 ms.

FIG. 5 is a flowchart illustrating an example process 500 for camera synchronization. At block 502, the process 500 can include determining, for each camera of a plurality of cameras (e.g., cameras 102) associated with an electronic device (e.g., electronic device 100), a common point within an exposure time corresponding to a frame being requested from each camera. In some examples, the common point can be a middle of exposure time associated with the frame.

In some examples, the process 500 can include determining the common point based on state data stored in a storage or memory device. In some cases, the state data can include a sensor read delay, a start of frame time associated with a previous frame captured by the camera, the duration of the frame prior to adjustment, a respective duration of a pending frame previously requested from the camera, and/or an exposure for the frame being requested from the camera. In some examples, the sensor read delay can include a camera sensor read delay between an end of exposure time and the start of frame time. In some examples, the start of frame time can include a time when the camera starts sending, to one or more processors of the electronic device, image data associated with the previous frame. In some examples, the previous frame can include the last frame captured by the camera.

At block 504, the process 500 can include determining, based on the common point determined for each camera of the plurality of cameras, a respective synchronization error of each camera from the plurality of cameras.

At block 506, the process 500 can include, based on the respective synchronization error, adjusting a duration of the frame at one or more cameras from the plurality of cameras. In some examples, the adjusted duration of the frame aligns the common point at each camera for the frame.

In some examples, the plurality of cameras can include a synchronization master camera and the one or more cameras. In some aspects, to adjust the duration of the frame, the process 500 can further include, for each of the one or more cameras, increasing or decreasing the duration of the frame by a value corresponding to the respective synchronization error.

In some aspects, the process 500 can include, for each camera, determining an exposure for the frame; for each camera, predicting a start of frame for a pending frame previously requested from the camera; and for each camera, determining a start of frame for the frame. In some examples, determining the common point can include determining the common point based on the exposure for the frame, the start of frame for the pending frame, and the start of frame for the frame.

In some examples, to adjust the duration of the frame at the one or more cameras, the process 500 can include, based on the respective synchronization error, determining, for each of the one or more cameras, a respective frame time that reduces the synchronization error to zero. The process 500 can further include determining the duration of the frame based on the respective frame time.

In some aspects, the process 500 can include refraining from adjusting the duration of the frame at a synchronization master camera. In some examples, to adjust the duration of the frame at the one or more cameras, the process 500 can include, for a first camera from the plurality of cameras, increasing or decreasing a first duration of the frame associated with the first camera by the respective synchronization error associated with the first camera. The process 500 can further include, for a second camera from the plurality of cameras, increasing or decreasing a second duration of the frame associated with the second camera by the respective synchronization error associated with the second camera. In some cases, the respective synchronization error associated with the first camera can include a first synchronization error between the synchronization master camera and the first camera, and the respective synchronization error associated with the second camera can include a second synchronization error between the synchronization master camera and the second camera.

In some examples, the processes described herein (e.g., process 500 and/or any other process described herein) may be performed by a computing device or apparatus. In one example, the process 500 can be performed by the electronic device 100 of FIG. 1. In another example, the process 500 can be performed by the computing system having the computing device architecture 600 shown in FIG. 6. For instance, a computing device with the computing device architecture 600 shown in FIG. 6 can implement the operations of FIG. 5 and/or the components and/or operations described herein with respect to any of FIGS. 1 through 5.

The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a laptop computer, a smart television, a camera, and/or any other computing device with the resource capabilities to perform the processes described herein, including the process 500 and/or any other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 500 is illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 500 and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 6:
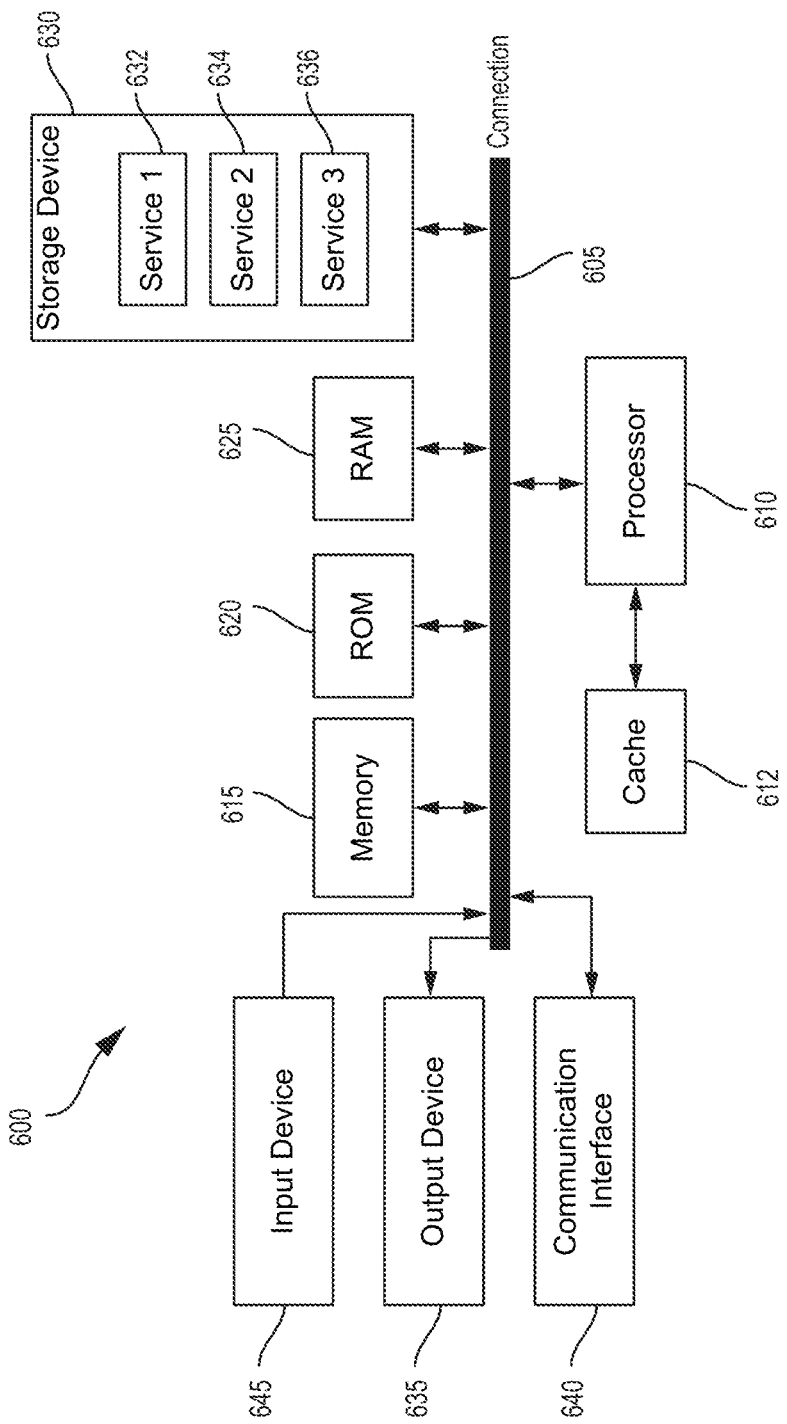
FIG. 6 is a diagram illustrating an example system architecture for implementing certain aspects described herein.

FIG. 6 is a diagram illustrating an example of a system for implementing certain aspects of the present technology. In particular, FIG. 6 illustrates an example of computing system 600, which can be for example any computing device making up a computing system, a camera system, or any component thereof in which the components of the system are in communication with each other using connection 605. Connection 605 can be a physical connection using a bus, or a direct connection into processor 610, such as in a chipset architecture. Connection 605 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 600 includes at least one processing unit (CPU or processor) 610 and connection 605 that couples various system components including system memory 615, such as read-only memory (ROM) 620 and random access memory (RAM) 625 to processor 610. Computing system 600 can include a cache 612 of high-speed memory connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms. In some instances, multimodal systems can enable a user to provide multiple types of input/output to communicate with computing system 600. Computing system 600 can include communications interface 640, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 602.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 640 may also include one or more Global Navigation Satellite System (GNSS) receivers or transceivers that are used to determine a location of the computing system 600 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 630 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/ReRAM), phase change memory (PCM), spin transfer torque RAM (STT-RAM), another memory chip or cartridge, and/or a combination thereof.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative examples of the disclosure include:

Aspect 1. An apparatus for synchronizing cameras, the apparatus comprising: memory; and one or more processors coupled to the memory, the one or more processors being configured to: determine, for each camera of a plurality of cameras associated with the apparatus, a common point within an exposure time corresponding to a frame being requested from each camera; determine, based on the common point determined for each camera, a respective synchronization error of each camera from the plurality of cameras; and adjust, based on the respective synchronization error of each camera, a duration of the frame at one or more cameras from the plurality of cameras, wherein the adjusted duration of the frame aligns the common point within each exposure time at each camera for the frame.

Aspect 2. The apparatus of Aspect 1, wherein the common point is a middle point within the exposure time.

Aspect 3. The apparatus of any of Aspects 1 to 2, wherein, to determine the common point, the one or more processors are configured to determine the common point based on state data comprising at least one of a sensor read delay, a start of frame time associated with a previous frame captured by camera, the duration of the frame prior to adjustment, a respective duration of a pending frame previously requested from the camera, and an exposure for the frame being requested from the camera.

Aspect 4. The apparatus of Aspect 3, wherein the sensor read delay comprises a camera sensor read delay between an end of exposure time and the start of frame time, wherein the start of frame time comprises a time when the camera starts sending to the one or more processors image data associated with the previous frame, and wherein the previous frame comprises a last frame captured by the camera.

Aspect 5. The apparatus of any of Aspects 1 to 4, wherein the plurality of cameras comprises a synchronization master camera and the one or more cameras, and wherein, to adjust the duration of the frame, the one or more processors are configured to: adjust, for each of the one or more cameras, the duration of the frame by a value corresponding to the respective synchronization error.

Aspect 6. The apparatus of any of Aspects 1 to 5, wherein the one or more processors are configured to: determine, for each camera, an exposure of the frame; predict, for each camera, a start of frame for a pending frame previously requested from each camera; and determine, for each camera, a start of frame for the frame.

Aspect 7. The apparatus of Aspect 6, wherein, to determine the common point, the one or more processors are configured to determine the common point based on the exposure for the frame, the start of frame for the pending frame, and the start of frame for the frame.

Aspect 8. The apparatus of any of Aspects 1 to 7, wherein, to adjust the duration of the frame at the one or more cameras, the one or more processors are configured to: determine, for each camera of the one or more cameras, a respective frame time that reduces the respective synchronization error of each camera to zero, wherein the respective frame time is determined based on the respective synchronization error of each camera; and determine the duration of the frame based on the respective frame time.

Aspect 9. The apparatus of any of Aspects 1 to 8, wherein the one or more processors are configured to refrain from adjusting the duration of the frame at a synchronization master camera from the plurality of cameras.

Aspect 10. The apparatus of any of Aspects 1 to 9, wherein, to adjust the duration of the frame at the one or more cameras, the one or more processors are configured to: adjust, for a first camera from the plurality of cameras, a first duration of the frame associated with the first camera by the respective synchronization error associated with the first camera; and adjust, for a second camera from the plurality of cameras, a second duration of the frame associated with the second camera by the respective synchronization error associated with the second camera.

Aspect 11. The apparatus of Aspect 10, wherein the respective synchronization error associated with the first camera comprises a first synchronization error between the synchronization master camera and the first camera, wherein the respective synchronization error associated with the second camera comprises a second synchronization error between the synchronization master camera and the second camera.

Aspect 12. The apparatus of any of Aspects 1 to 11, further comprising the plurality of cameras.

Aspect 13. The apparatus of any of Aspects 1 to 12, wherein the apparatus comprises a mobile device.

Aspect 14. The apparatus of any of Aspects 1 to 13, wherein the apparatus comprises an extended reality device.

Aspect 15. A method for synchronizing cameras, the method comprising: determining, for each camera of a plurality of cameras associated with an electronic device, a common point within an exposure time corresponding to a frame being requested from each camera; determining, based on the common point determined for each camera of the plurality of cameras, a respective synchronization error of each camera from the plurality of cameras; and adjusting, based on the respective synchronization error of each camera, a duration of the frame at one or more cameras from the plurality of cameras, wherein the adjusted duration of the frame aligns the common point within each respective exposure time at each camera for the frame.

Aspect 16. The method of Aspect 15, wherein the common point is a middle point within the exposure time.

Aspect 17. The method of any of Aspects 15 to 16, wherein determining the common point comprises determining the common point based on state data comprising at least one of a sensor read delay, a start of frame time associated with a previous frame captured by the camera, the duration of the frame prior to adjustment, a respective duration of a pending frame previously requested from the camera, and an exposure for the frame being requested from the camera.

Aspect 18. The method of Aspect 17, wherein the sensor read delay comprises a camera sensor read delay between an end of exposure time and the start of frame time, wherein the start of frame time comprises a time when the camera starts sending to the one or more processors image data associated with the previous frame, and wherein the previous frame comprises a last frame captured by the camera.

Aspect 19. The method of any of Aspects 15 to 18, wherein the plurality of cameras comprises a synchronization master camera and the one or more cameras, and wherein adjusting the duration of the frame further comprises: adjusting, for each of the one or more cameras, the duration of the frame by a value corresponding to the respective synchronization error.

Aspect 20. The method of any of Aspects 15 to 19, further comprising: determining, for each camera, an exposure for the frame; predicting, for each camera, a start of frame for a pending frame previously requested from each camera; and determining, for each camera, a start of frame for the frame.

Aspect 21. The method of Aspect 20, wherein determining the common point comprises determining the middle of exposure time based on the exposure for the frame, the start of frame for the pending frame, and the start of frame for the frame.

Aspect 22. The method of any of Aspects 15 to 21, wherein adjusting the duration of the frame at the one or more cameras comprises: determining, for each camera of the one or more cameras, a respective frame time that reduces the respective synchronization error of each camera to zero, wherein the respective frame time is determined based on the respective synchronization error of each camera; and determining the duration of the frame based on the respective frame time.

Aspect 23. The method of any of Aspects 15 to 22, further comprising refraining from adjusting the duration of the frame at a synchronization master camera from the plurality of cameras.

Aspect 24. The method of any of Aspects 15 to 23, wherein adjusting the duration of the frame at the one or more cameras comprises: adjusting, for a first camera from the plurality of cameras, a first duration of the frame associated with the first camera by the respective synchronization error associated with the first camera; and adjusting, for a second camera from the plurality of cameras, a second duration of the frame associated with the second camera by the respective synchronization error associated with the second camera.

Aspect 25. The method of Aspect 24, wherein the respective synchronization error associated with the first camera comprises a first synchronization error between the synchronization master camera and the first camera, wherein the respective synchronization error associated with the second camera comprises a second synchronization error between the synchronization master camera and the second camera.

Aspect 26. A non-transitory computer-readable medium containing instructions which, when executed by one or more processors, cause the one or more processors to perform a method according to any of Aspects 15 to 25.

Aspect 27. An apparatus comprising means for performing a method according to any of Aspects 15 to 25.

What is claimed is:

1. An apparatus for processing image data, the apparatus comprising:
    a memory; and
    one or more processors coupled to the memory, the one or more processors configured to:
        determine, for each camera of a plurality of cameras associated with the apparatus, a common point within an exposure time of a frame being requested from each camera based at least on a respective camera sensor read delay for each camera, a previous frame captured by each camera, and a pending frame previously requested from each camera, the respective camera sensor read delay for each camera of the plurality of cameras including a delay between a respective end of exposure time and a respective start of frame time for each camera;
        determine, based on the common point determined for each camera of the plurality of cameras, a respective synchronization error of each camera from the plurality of cameras; and
        adjust, based on the respective synchronization error of each camera, a duration of the frame at one or more cameras from the plurality of cameras, wherein the adjusted duration of the frame aligns the common point within each exposure time at each camera for the frame.

2. The apparatus of claim 1, wherein the common point is a middle point within the exposure time.

3. The apparatus of claim 1, wherein, to determine the common point, the one or more processors are configured to:
    determine the common point for a camera from the plurality of cameras based on state data comprising at least one of a camera sensor read delay for the camera, a start of frame time associated with a previous frame captured by the camera, the duration of the frame prior to adjustment, a respective duration of a pending frame previously requested from the camera, or an exposure for the frame being requested from the camera.

4. The apparatus of claim 3, wherein the camera sensor read delay for the camera includes a delay between an end of exposure time for the camera and the start of frame time associated with the previous frame captured by the camera, wherein the start of frame time comprises a time when the camera starts sending to the one or more processors image data associated with the previous frame captured by the camera, and wherein the previous frame comprises a last frame captured by the camera.

5. The apparatus of claim 1, wherein the plurality of cameras comprises a synchronization master camera and the one or more cameras, and wherein, to adjust the duration of the frame, the one or more processors are configured to:
    adjust, for each of the one or more cameras, the duration of the frame by a value corresponding to the respective synchronization error.

6. The apparatus of claim 1, wherein the one or more processors are configured to:
    determine, for each camera, an exposure of the frame;
    predict, for each camera, a start of frame for the pending frame previously requested from each camera; and
    determine, for each camera, a start of frame for the frame.

7. The apparatus of claim 6, wherein the one or more processors are configured to determine the common point based on the exposure for the frame, the start of frame for the pending frame, and the start of frame for the frame.

8. The apparatus of claim 1, wherein, to adjust the duration of the frame at the one or more cameras, the one or more processors are configured to:
    determine, for each camera of the one or more cameras, a respective frame time that reduces the respective synchronization error of each camera to zero, wherein the respective frame time is determined based on the respective synchronization error of each camera; and
    determine the duration of the frame based on the respective frame time.

9. The apparatus of claim 1, wherein the one or more processors are configured to refrain from adjusting the duration of the frame at a synchronization master camera from the plurality of cameras.

10. The apparatus of claim 9, wherein, to adjust the duration of the frame at the one or more cameras, the one or more processors are configured to:
    adjust, for a first camera from the plurality of cameras, a first duration of the frame associated with the first camera by the respective synchronization error associated with the first camera; and
    adjust, for a second camera from the plurality of cameras, a second duration of the frame associated with the second camera by the respective synchronization error associated with the second camera.

11. The apparatus of claim 10, wherein the respective synchronization error associated with the first camera comprises a first synchronization error between the synchronization master camera and the first camera, wherein the respective synchronization error associated with the second camera comprises a second synchronization error between the synchronization master camera and the second camera.

12. The apparatus of claim 1, further comprising the plurality of cameras.

13. The apparatus of claim 1, wherein the apparatus comprises a mobile device.

14. The apparatus of claim 13, wherein the mobile device comprises an extended reality device.

15. A method for processing image data, the method comprising:
- determining, for each camera of a plurality of cameras associated with an electronic device, a common point within an exposure time corresponding to a frame being requested from each camera based at least on a respective camera sensor read delay for each camera, a previous frame captured by each camera, and a pending frame previously requested from each camera, the respective camera sensor read delay for each camera of the plurality of cameras including a delay between a respective end of exposure time and a respective start of frame time for each camera;
- determining, based on the common point determined for each camera of the plurality of cameras, a respective synchronization error of each camera from the plurality of cameras; and
- adjusting, based on the respective synchronization error of each camera, a duration of the frame at one or more cameras from the plurality of cameras, wherein the adjusted duration of the frame aligns the common point within each exposure time at each camera for the frame.

16. The method of claim 15, wherein the common point is a middle point within the exposure time.

17. The method of claim 15, wherein determining the common point comprises:
- determining the common point for a camera from the plurality of cameras based on state data comprising at least one of a camera sensor read delay for the camera, a start of frame time associated with a previous frame captured by the camera, the duration of the frame prior to adjustment, a respective duration of a pending frame previously requested from the camera, or an exposure for the frame being requested from the camera.

18. The method of claim 17, wherein the camera sensor read delay for the camera includes a delay between an end of exposure time for the camera and the start of frame time associated with the previous frame captured by the camera, wherein the start of frame time comprises a time when the camera starts sending to one or more processors image data associated with the previous frame captured by the camera, and wherein the previous frame comprises a last frame captured by the camera.

19. The method of claim 15, wherein the plurality of cameras comprises a synchronization master camera and the one or more cameras, and wherein adjusting the duration of the frame further comprises:
- adjusting, for each of the one or more cameras, the duration of the frame by a value corresponding to the respective synchronization error.

20. The method of claim 15, further comprising:
- determining, for each camera, an exposure for the frame;
- predicting, for each camera, a start of frame for the pending frame previously requested from each camera; and
- determining, for each camera, a start of frame for the frame.

21. The method of claim 20, wherein determining the common point comprises determining the common point based on the exposure for the frame, the start of frame for the pending frame, and the start of frame for the frame.

22. The method of claim 15, wherein adjusting the duration of the frame at the one or more cameras comprises:
- determining, for each camera of the one or more cameras, a respective frame time that reduces the respective synchronization error of each camera to zero, wherein the respective frame time is determined based on the respective synchronization error of each camera; and
- determining the duration of the frame based on the respective frame time.

23. The method of claim 15, further comprising refraining from adjusting the duration of the frame at a synchronization master camera from the plurality of cameras.

24. The method of claim 23, wherein adjusting the duration of the frame at the one or more cameras comprises:
- adjusting, for a first camera from the plurality of cameras, a first duration of the frame associated with the first camera by the respective synchronization error associated with the first camera; and
- adjusting, for a second camera from the plurality of cameras, a second duration of the frame associated with the second camera by the respective synchronization error associated with the second camera.

25. The method of claim 24, wherein the respective synchronization error associated with the first camera comprises a first synchronization error between the synchronization master camera and the first camera, wherein the respective synchronization error associated with the second camera comprises a second synchronization error between the synchronization master camera and the second camera.

26. A non-transitory computer-readable medium containing instructions which, when executed by one or more processors, cause the one or more processors to:
- determine, for each camera of a plurality of cameras associated with an electronic device, a common point within an exposure time corresponding to a frame being requested from each camera based at least on a respective camera sensor read delay for each camera, a previous frame captured by each camera, and a pending frame previously requested from each camera, the respective camera sensor read delay for each camera of the plurality of cameras including a delay between a respective end of exposure time and a respective start of frame time for each camera;
- determine, based on the common point determined for each camera of the plurality of cameras, a respective synchronization error of each camera from the plurality of cameras; and
- adjust, based on the respective synchronization error of each camera, a duration of the frame at one or more cameras from the plurality of cameras, wherein the adjusted duration of the frame aligns the common point within each exposure time at each camera for the frame.

27. The non-transitory computer-readable medium of claim 26, wherein the common point is a middle point within the exposure time.

28. The non-transitory computer-readable medium of claim 26, wherein, to determine the common point, the instructions, when executed by one or more processors, cause the one or more processors to:
- determine the common point for a camera from the plurality of cameras based on state data comprising at least one of a camera sensor read delay for the camera, a start of frame time associated with a previous frame captured by the camera, the duration of the frame prior to adjustment, a respective duration of a pending frame previously requested from the camera, or an exposure for the frame being requested from the camera.

29. The non-transitory computer-readable medium of claim 28, wherein the camera sensor read delay for the camera includes a delay between an end of exposure time for the camera and the start of frame time associated with the previous frame captured by the camera, wherein the start of frame time comprises a time when the camera starts sending to the one or more processors image data associated with the previous frame captured by the camera, and wherein the previous frame comprises a last frame captured by the camera.

30. The non-transitory computer-readable medium of claim 26, wherein the plurality of cameras comprises a synchronization master camera and the one or more cameras, and wherein adjusting the duration of the frame further comprises:

adjusting, for each of the one or more cameras, the duration of the frame by a value corresponding to the respective synchronization error.

* * * * *